July 9, 1940.  F. STOTT  2,207,077
AUTOMATIC BUTTON MECHANISM
Filed April 19, 1940
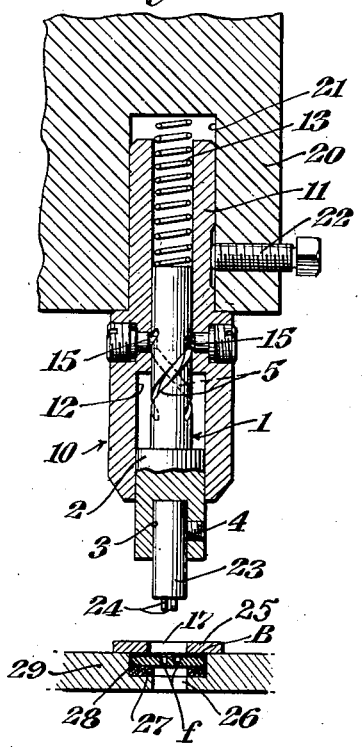
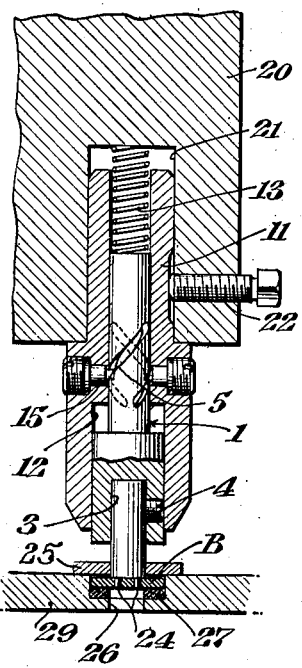
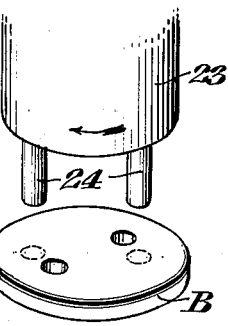
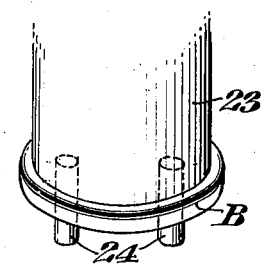
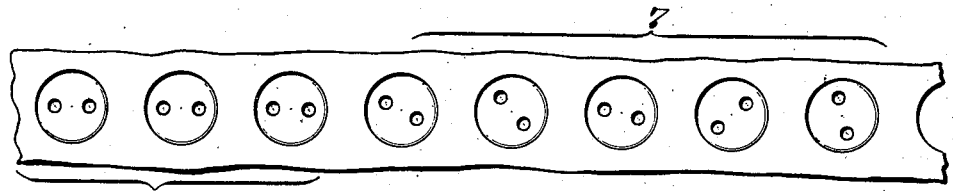
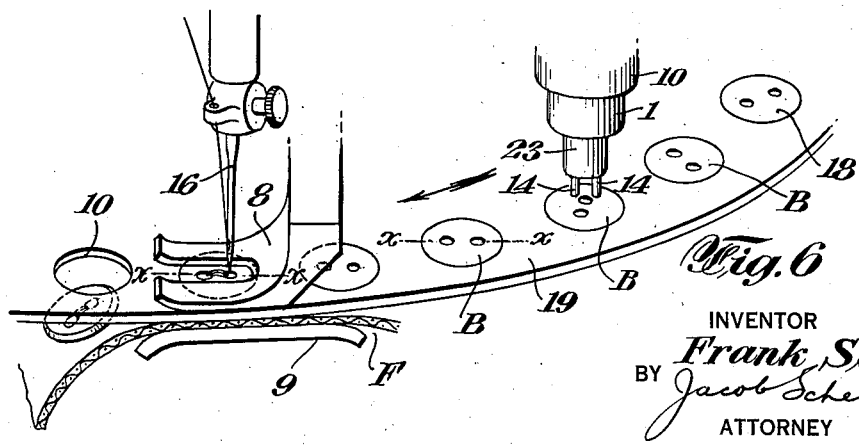
INVENTOR
Frank Stott
BY Jacob Schechter
ATTORNEY Patented July 9, 1940

2,207,077

UNITED STATES PATENT OFFICE 2,207,077

AUTOMATIC BUTTON MECHANISM

Frank Stott, St. Albans, N. Y., assignor, by mesne assignments, to Buttondex Corporation, New York, N. Y., a corporation of New York Application April 19, 1940, Serial No. 330,489

14 Claims. (Cl. 112—113)

This invention relates to a mechanism which will automatically position itself into the holes of a composition or pearl button. Such a device may be used in button-sewing machines for properly positioning the button so that its holes are correctly aligned with respect to the sewing needle. The device may also be used in punching or "clearing" the holes of composition or plastic buttons. The device will be described in connection with both uses, although it is apparent that the invention has further uses and applications. One embodiment of the invention is shown in the accompanying figures, wherein:

Fig. 1 is a sectional elevation, with the head in raised position;

Fig. 2 is likewise a sectional elevation, but with the head in a down position;

Figs. 3 and 4 are perspective views of the pins, showing the "hole-hunting" operation;

Fig. 5 shows, in plan, a strip or card with buttons arranged thereon; and

Fig. 6 is an elevational view of the indexing and sewing stations.

The punch head 20, Figs. 1 and 2, is provided with a counterbored hole 21 in which is received the shank 11 of the "hole-finding" mechanism, more particularly, the tube or holding member 10, which is held in place by a set screw 22. The tube 10 is itself provided with a counterbored hole 12 in which is received the socket head 2 of an inner spindle member 1, the spindle thereof fitting in the bore of the tubular member 10, as shown. Finally, the spindle member, or rather its head 2, is provided with a smaller counterbore or socket 3 in which is fitted a tool 23, held securely by set screw 4.

The buttons, designated B, are brought to underlie the punch head 20, more particularly, the tool 23, by a conveyor 29, which may be of the circular disc type, the belt type or any other type commonly used. The conveyor plate 29 is provided with a number of recesses 28, in the floor of which is secured a rubber washer 27 (the purpose of which will be explained). The buttons (B) are automatically fed from a hopper to the button-recesses 28 of the conveyor plate.

The conveyor plate is further provided with a hole 26 centrally located in the button recess 27 so that when the button recess comes under the tool 23 (as shown in Figs. 1 and 2) the lower end of the tool may pass through the hole (in the event that no button is present in the recess).

Plastic buttons as they are made on the molding machines have a thin film which closes one face of the button holes; this film is designated $f$ in Fig. 1. It is the object of the mechanism shown in Figs. 1 and 2 to pierce this plastic film, or to "clear" the button holes. For this purpose the tool 23 is provided with a number of punch pins 24. The number, size and spacing arrangement of the punch pins depend upon the number, size and spacing of the holes of the particular button being processed. To adapt the machine for a particular type of button a tool 23 designed with the proper pins, is slipped into the socket 3 and secured by set screw 4.

The device of this invention is fully automatic in its operation and will "hunt" for the holes of the button irrespective of the angular orientation of the button, and will enter and pierce the film, all without the intervention of a human operator. In the bore of the fixed tube member 10 and above the upper end of the movable spindle member 1 is provided a compression spring 13. In the normal raised position of the punch head 20 (as shown in Fig. 1) the spring, one end of which presses against the seat of the punch bore 21, presses the spindle member to its outward or extended position, as shown in Fig. 1. The spindle is further provided with a pair of helical grooves 5 cut therein with a long pitch. The helical grooves are symmetrically positioned on opposite sides of the spindle, as clearly seen in Fig. 1. The tubular member 10 is provided with a pair of pins or followers 15 which fit in the respective helical grooves 5.

The helical grooves 5 and their fixed followers or pins 15 impart an extent of rotation to the spindle member 1 and its tool 23. As the punch head comes down, at which time the tool 23 is in extended position (as shown in Fig. 1), the punch pins 24 will rarely find the holes of the button properly aligned for entrance. In most cases, the pins will abut against an imperforate portion of the button. The effect of this abutting is a receding of the spindle member into the tubular holding member 1 concurrently with a slight turning of the spindle member including its tool 23 and pins 24 (due of course to the helical grooves). The turning of the tool is relative to the button. To better assure that the button itself is not turned by the abutting pins, the rubber washer 27 is provided to furnish friction against the button's turning. A sufficient degree of turning is given to the tool so that in the course of its turning, the pins will align themselves with the button holes, irrespective of the original angular orientation of the button in the recess. At the instant of the alignment, the pins 24 will snap into the button holes and will pierce the film $f$, the pins being sufficiently sharp for that purpose. The actual piercing may be the result of the compressed spring 13 (see Fig. 2) or it may be due to a positive force from the punch, the head 2 of the tool carrying member being stopped by the recess or socket 12 of the tube or holder.

Upon the raising of the punch head, the punch pins 24 are withdrawn from the pierced or cleared holes. To prevent the button from being lifted together with the raising punch pins, a stripper 25 is provided. This is a short strip of metal which overlies the coveyor plate a slight distance to permit the latter to clear underneath it. The stripper 25 is provided with a hole 17 through which the tool 23 may clear (see Fig. 2). There is thus provided an overhung portion, the button being larger than the hole 17, which prevents the button from raising as the tool is withdrawn.

When applied for indexing the buttons in a machine for automatically sewing them onto a garment, the tool 23, Fig. 6, and the spindle member 1 and tube member 10, are positioned a short distance from the needle 16. The buttons may be brought to indexing and sewing positions by any suitable conveyor means, as for example, by the disc conveyor plate 19 moving in the direction of the arrow and provided with button openings 18 to which buttons are automatically fed from a hopper. The tool 23, as before, is provided with pins 14, the number, size and arrangement of which depend upon the particular button being used. The pins 14 need not be squared like the punch pins 24, but may be slightly rounded, as shown.

As explained, the downstroke of the holder 10 causes a turning of the spindle member 1 and its tool 23, the pins 14 of which "hunt" for the button holes and, having become aligned with them, snap into the holes. The pin tool has a predetermined angle of turning and, irrespective of the particular point of its turning when its pins snap into the button holes, the buttons will always be in the same angular position when the pins leave the button. This angular position is such as will bring the button holes properly under the sewing needle 16. The buttons, upon being indexed or turned to the proper angular position, remain in this position until arrival at the sewing station. To more positively retain the buttons in the turned angular position, the size of the recesses or openings 18 is such that the buttons fit therein with a slight frictional engagement.

As now practiced a human operator is required to turn the button under the needle so that it enters one of the button holes. A single needle is used, the thread being continuous; the needle, provided it is properly started in one of the holes, will go automatically from hole to hole until the button is completely sewn. A two-hole button is shown in Fig. 6 for illustration purposes. The indexing pins leave the button with its holes oriented on the line $x$—$x$, see button B', so that the holes will coincide with line X—X underlying the sewing needle, with one of the holes aligned with the needle. The fabric F is fed on table 9 to the sewing station. Overlying the button conveyor is the presser foot 8 which is brought down just prior to the sewing operation, to hold the button firmly during the sewing.

In Fig. 5 is shown a strip of cardboard or similar material and a plurality of buttons which are received in countersunk recesses provided in the strip. The buttons designated 7 are haphazardly oriented with their holes lying on lines pointed in all directions, whereas the buttons 6 have been indexed by the device of this invention. This figure illustrates a further use of the device, in properly arraying buttons on a card, for another required operation, such as, for example, the stapling of the buttons onto the card by a stapling machine or the like.

Instead of clearing the holes of composition buttons by piercing the film (as explained with reference to Figs. 1 and 2), the un-cleared buttons may be supplied directly to the button sewing machine (Fig. 6) and the pins 14 made square as in Figs. 1 and 2, so that they not only index the buttons for the sewing operation but will pierce the film at the same time.

I claim:

1. An automatic mechanism for a button machine of the type which includes a button conveyor provided with button recesses, a punching station including a punch and means for bringing the button recesses successively to the said station to underlie the said punch, the said machine being used for piercing the film of composition buttons, the said automatic mechanism comprising a tubular holder secured in the head of the punch and provided with a socket, a spindle member slidable in the bore of the holder and having an enlarged head received in the said holder socket, the said head being provided with a socket, a tool having punch-pins of a number, size and arrangement depending upon the button, replaceably secured in the said spindle socket, a compression spring positioned in the bore of the holder above the spindle member to maintain the same in an extended position, the said spindle being provided with a pair of helical grooves, and the said holder being provided with a pair of pins received in the said grooves, the said recesses of the button conveyor being provided with a rubber washer and the portion of the conveyor underlying the recess being provided with a centrally located hole somewhat larger than the diameter of the said tool, and a stripper comprising a strip of metal secured above the conveyor and provided with a hole somewhat larger than the diameter of the said tool.

2. An automatic mechanism for a button machine of the type which includes a button conveyor provided with button recesses, a punching station including a punch and means for bringing the button recesses successively to the said station to underlie the said punch, the said machine being used for piercing the film of composition buttons, the said automatic mechanism comprising a tubular holder secured in the head of the punch and provided with a socket, a spindle member slidable in the bore of the holder and having an enlarged head received in the said holder socket, the said head being provided with a socket, a tool having punch-pins of a number, size and arrangement depending upon the button, replaceably secured in the said spindle socket, a compression spring positioned in the bore of the holder above the spindle member to maintain the same in an extended position, the said spindle being provided with a pair of helical grooves, and the said holder being provided with a pair of pins received in the said grooves, the said recesses of the button conveyor being provided with a rubber washer and the portion of the conveyor underlying the recess being provided with a centrally located hole somewhat larger than the diameter of the said tool.

3. An automatic mechanism for a button machine of the type which includes a button conveyor provided with button recesses, a punching station including a punch and means for bringing the button recesses successively to the said station to underlie the said punch, the said machine being used for piercing the film of composition buttons, the said automatic mechanism comprising a tubular holder secured in the head of the punch and provided with a socket, a spindle member slidable in the bore of the holder and having an enlarged head received in the said holder socket, the said head being provided with a socket, a tool having punch-pins of a number, size and arrangement depending upon the button, replaceably secured in the said spindle socket, a compression spring positioned in the bore of the holder above the spindle member to maintain the same in an extended position, the said spindle being provided with a pair of helical grooves, and the said holder being provided with a pair of pins received in the said grooves, the said recesses of the button conveyor being provided with a rubber washer.

4. An automatic mechanism for a button machine of the type which includes a button conveyor provided with button recesses, a punching station including a punch and means for bringing the button recesses successively to the said station to underlie the said punch, the said machine being used for piercing the film of composition buttons, the said automatic mechanism comprising a tubular holder secured in the head of the punch, a spindle member slidable in the bore of the holder and provided with a socket, a tool having punch-pins of a number, size and arrangement depending upon the button, replaceably secured in the said spindle socket, a compression spring positioned in the bore of the holder above the spindle member to maintain the same in an extended position, the said spindle being provided with a pair of helical grooves and the said holder being provided with a pair of pins received in the said grooves, and means for moving the said tubular holder and the said spindle member toward a button in the said button recess of the conveyor.

5. An automatic mechanism for a button machine of the type which includes a button conveyor provided with button recesses, a punching station including a punch and means for bringing the button recesses successively to the said station to underlie the said punch, the said machine being used for piercing the film of composition buttons, the said automatic mechanism comprising a tubular holder secured in the head of the punch, a spindle member slidable in the bore of the holder and provided with a socket, a tool having punch-pins of a number, size and arrangement depending upon the button, replaceably secured in the said spindle socket, a compression spring positioned in the bore of the holder above the spindle member to maintain the same in an extended position, the said spindle being provided with a helical groove, and the said holder being provided with a pin received in the said groove, and means for moving the said tubular holder and the said spindle member toward a button in the said button recess of the conveyor.

6. An automatic mechanism for a button machine of the type which includes a button conveyor provided with button recesses, an operating station and means for bringing the button recesses successively to the said station, the said automatic mechanism comprising a tubular holder provided with a socket, a spindle member slidable in the bore of the holder and having an enlarged head received in the said holder socket, the said head being provided with a socket, a tool having pins of a number, size and arrangement depending upon the button, replaceably secured in the said spindle socket, a compression spring positioned in the bore of the holder above the spindle member to maintain the same in an extended position, the said spindle being provided with a pair of helical grooves, and the said holder being provided with a pair of pins received in the said grooves.

7. An automatic mechanism for a button machine of the type which includes a button conveyor provided with button recesses, an operating station and means for bringing the button recesses successively to the said station, the said automatic mechanism comprising a tubular holder, a spindle member slidable in the bore of the holder and provided with a socket, a tool having pins of a number, size and arrangement depending upon the button, replaceably secured in the said spindle socket, a compression spring positioned in the bore of the holder above the spindle member to maintain the same in an extended position, the said spindle being provided with a pair of helical grooves, and the said holder being provided with a pair of pins received in the said grooves, and means for moving the said tubular holder and the said spindle member toward a button in the said button recess of the conveyor.

8. An automatic mechanism for a button machine of the type which includes a button conveyor provided with button recesses, an operating station and means for bringing the button recesses successively to the said station, the said automatic mechanism comprising a tubular holder, a spindle member slidable in the bore of the holder and a tool having pins of a number, size and arrangement depending upon the button, replaceably secured in the said spindle, a compression spring positioned in the bore of the holder above the spindle member to maintain the same in an extended position, the said spindle being provided with a helical groove, and the said holder being provided with a pin received in the said groove, and means for moving the said tubular holder and the said spindle member toward a button in the said button recess of the conveyor.

9. An automatic mechanism for a button machine of the type which includes a button conveyor provided with button recesses, an operating station and means for bringing the button recesses successively to the said station, the said automatic mechanism comprising a tubular holder, a spindle member slidable in the bore of the holder and provided with a socket, a tool having pins of a number, size and arrangement depending upon the button, replaceably secured in the said spindle socket, means for maintaining the said spindle member in an extended position, the said spindle being provided with a pair of helical grooves and the said holder being provided with a pair of pins received in the said grooves, and means for moving the said tubular holder and the said spindle member toward a button in the said button recess of the conveyor.

10. An automatic mechanism for a button machine of the type which includes a button conveyor provided with button recesses, an operating station and means for bringing the button recesses successively to the said station, the said automatic mechanism comprising a tubular holder, a spindle member slidable in the bore of the holder and provided with a socket, a tool having pins of a number, size and arrangement depending upon the button, replaceably secured in the said spindle socket, means for maintaining the said spindle member in an extended position, the said spindle being provided with a helical groove, and the said holder being provided with a pin receivable in the said groove, and means for moving the said tubular holder and the said spindle member toward a button in the said button recess of the conveyor.

11. An automatic mechanism for a button machine of the type which includes a button conveyor provided with button recesses, an operating station and means for bringing the button recesses successively to the said station, the said automatic mechanism comprising a holder, a second holder movable relative thereto, a tool having pins of a number, size and arrangement depending upon the button, replaceably secured in the said second holder, means for maintaining the said second holder in an extended position, and means for moving the two said holders toward a button in one of said button recesses of the conveyor and for turning the two holders relatively to each other.

12. An automatic mechanism for a button machine of the type which includes a button conveyor provided with button recesses, an operating station and means for bringing the button recesses successively to the said station, the said automatic mechanism comprising a holder, a second holder movable relative thereto, a tool having pins of a number, size and arrangement depending upon the button, replaceably secured in the said second holder, means for maintaining the said second holder in an extended position, and means for moving the two said holders toward a button in one of said button recesses of the conveyor and for turning the two holders relatively to each other, and means for preventing the button in said button recess from turning.

13. An automatic mechanism for a button machine of the type which includes a button conveyor provided with button recesses, an operating station and means for bringing the button recesses successively to the said station, the said automatic mechanism comprising a holder, a second holder movable relative thereto, a tool having pins of a number, size and arrangement depending upon the button, replaceably secured in the said second holder, and means for moving the two said holders toward a button in one of said button recesses of the conveyor and for turning the two holders relatively to each other.

14. An automatic mechanism for a button machine of the type which includes a button conveyor provided with button recesses, an operating station and means for bringing the button recesses successively to the said station, the said automatic mechanism comprising a holder, a second holder movable relative thereto and having pins of a number, size and arrangement depending upon the button, and means for moving the two said holders toward a button in one of said button recesses of the conveyor and for turning the two holders relatively to each other.

FRANK STOTT.